United States Patent
Nagao et al.

(10) Patent No.: US 10,841,886 B2
(45) Date of Patent: Nov. 17, 2020

(54) COMMUNICATION APPARATUS, COMMUNICATION METHOD, AND PROGRAM

(71) Applicant: Alps Alpine Co., Ltd., Tokyo (JP)

(72) Inventors: Katsuaki Nagao, Miyagi-ken (JP); Yuji Yanagisawa, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/552,851

(22) Filed: Aug. 27, 2019

(65) Prior Publication Data

US 2019/0387487 A1 Dec. 19, 2019

Related U.S. Application Data

(63) Continuation of application No. PCT/JP2018/007319, filed on Feb. 27, 2018.

(30) Foreign Application Priority Data

Mar. 10, 2017 (JP) ................................ 2017-046140

(51) Int. Cl.
*H04W 56/00* (2009.01)

(52) U.S. Cl.
CPC ....... *H04W 56/001* (2013.01); *H04W 56/004* (2013.01)

(58) Field of Classification Search
CPC . H04W 56/001; H04W 56/004; H04W 56/00; H04W 72/04; H04W 84/12
See application file for complete search history.

(56) References Cited

U.S. PATENT DOCUMENTS

| 9,585,144 | B1 * | 2/2017 | Shaw .................... H04W 76/15 |
| 2006/0133295 | A1 | 6/2006 | Sakai et al. |
| 2008/0084854 | A1 * | 4/2008 | Feder ................. H04N 21/4122 370/338 |
| 2010/0195595 | A1 | 8/2010 | Iwata |
| 2013/0016710 | A1 | 1/2013 | Shinohara |
| 2016/0294713 | A1 * | 10/2016 | Hiremath .............. H04W 56/00 |

FOREIGN PATENT DOCUMENTS

| EP | 1672841 A2 | 6/2006 |
| JP | 2006-174168 | 6/2006 |
| WO | WO 2009/016800 A1 | 2/2009 |
| WO | WO 2011/132761 A1 | 10/2011 |

OTHER PUBLICATIONS

International Search Report for corresponding International Application No. PCT/JP2018/0007319, dated May 15, 2018, 4 pages.

* cited by examiner

*Primary Examiner* — Afshawn M Towfighi
(74) *Attorney, Agent, or Firm* — Brinks Gilson & Lione

(57) ABSTRACT

A first communication mode and a second communication mode are switched therebetween in each cyclical time segment in which a transmission interval of a first beacon signal of another access point (a communication apparatus) is one interval. A period in the first communication mode in one time segment changes as the time segment advances. Thus, since the period in the first communication mode in one time segment changes as the time segment advances, it is easier for the period in the first communication mode and the transmission period of the first beacon signal to overlap each other.

7 Claims, 9 Drawing Sheets

FIG. 4
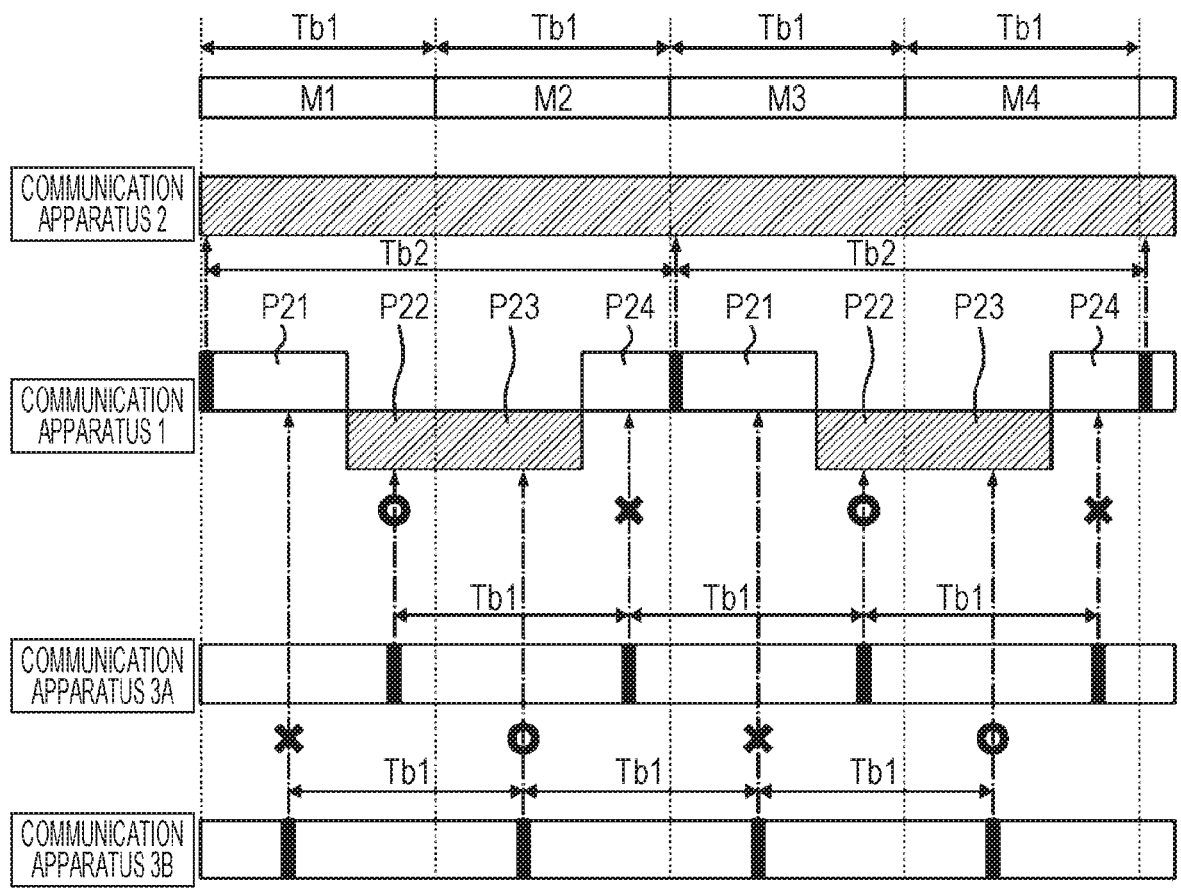
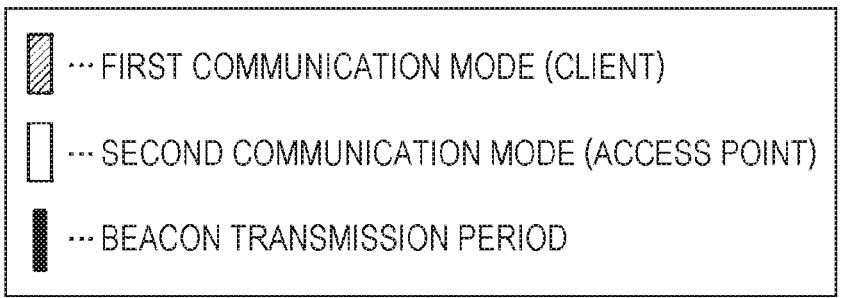

FIG. 5
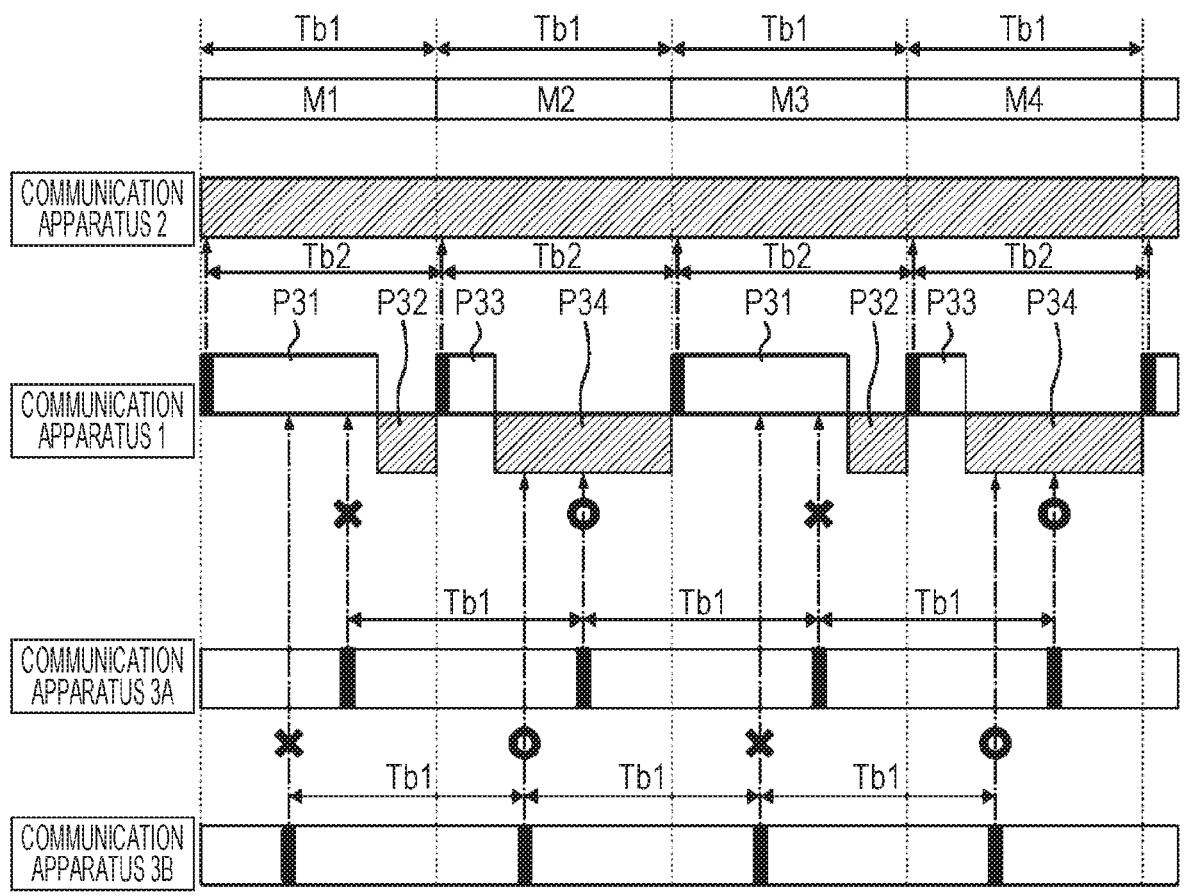
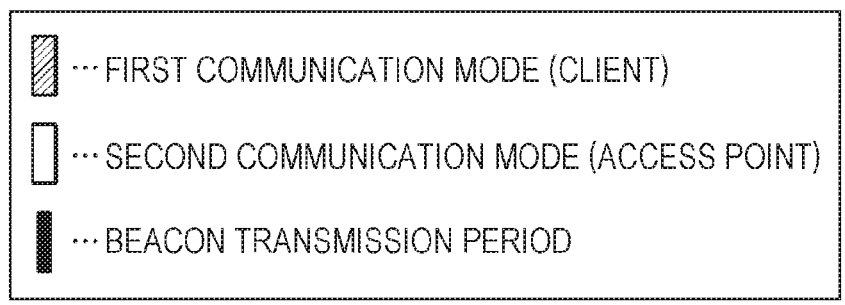

FIG. 6
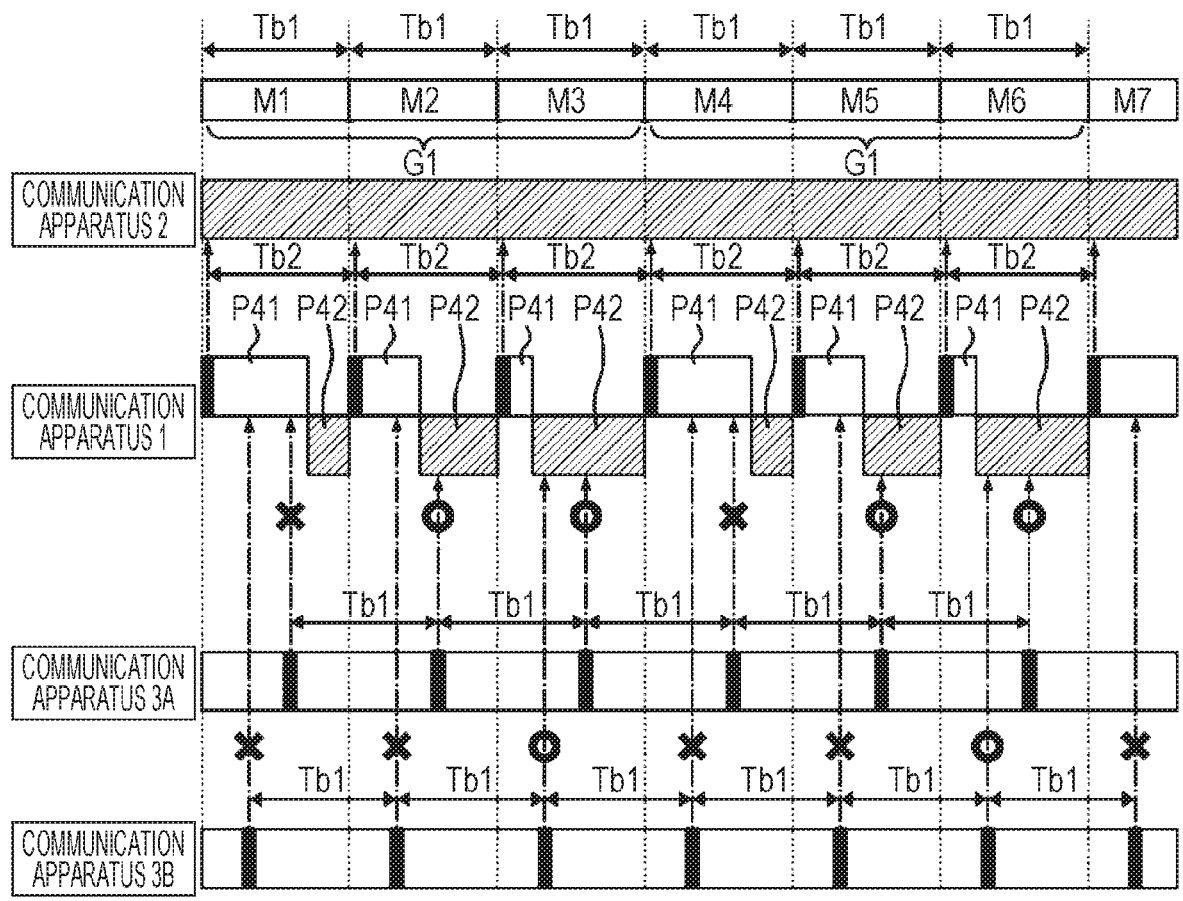
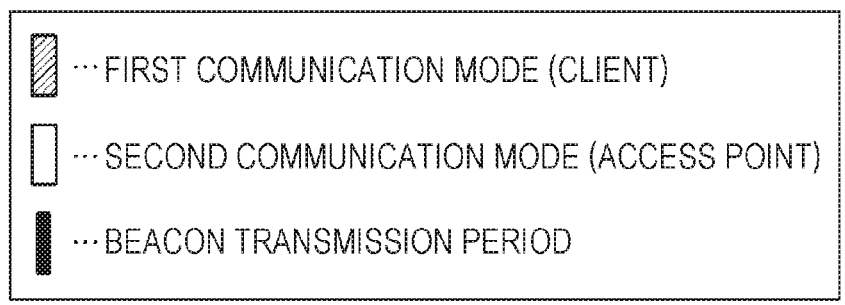

FIG. 7
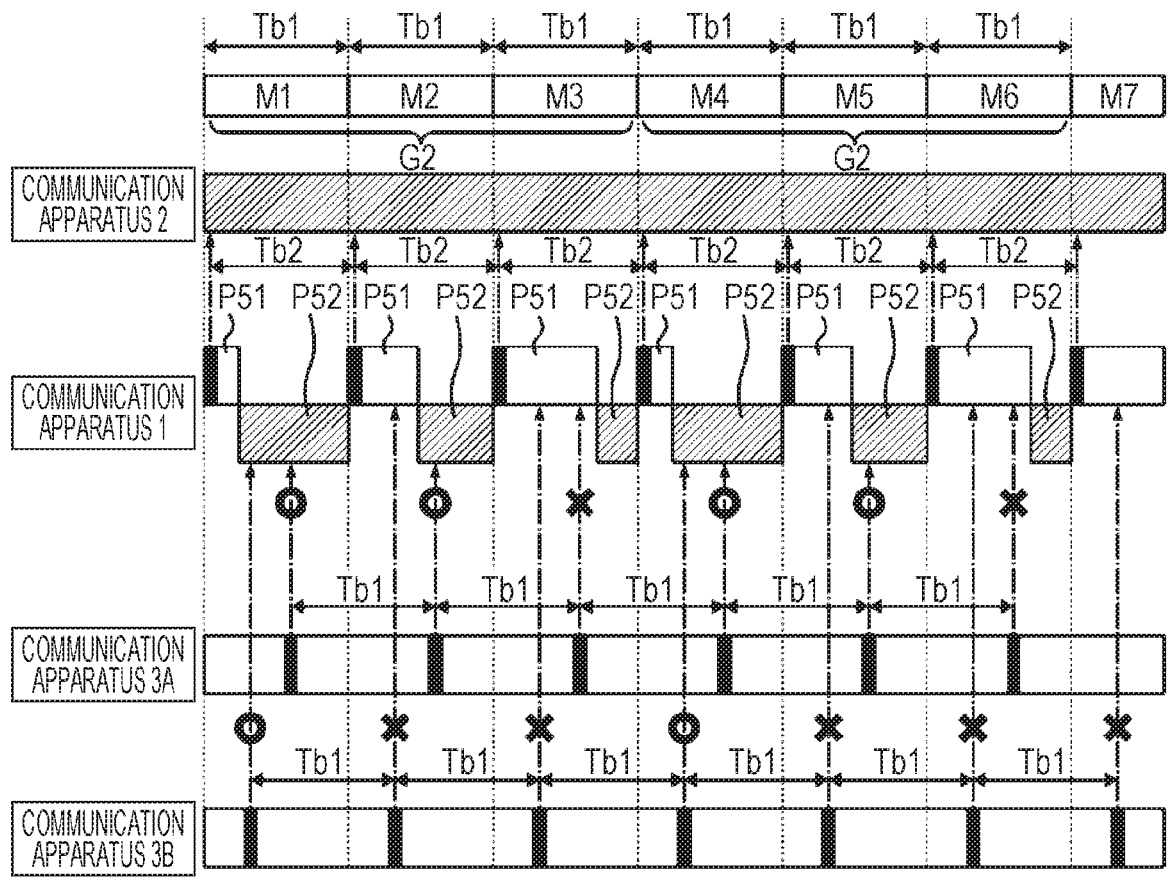
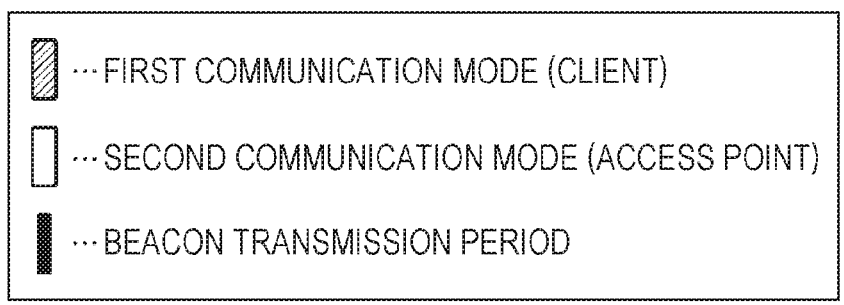

FIG. 8
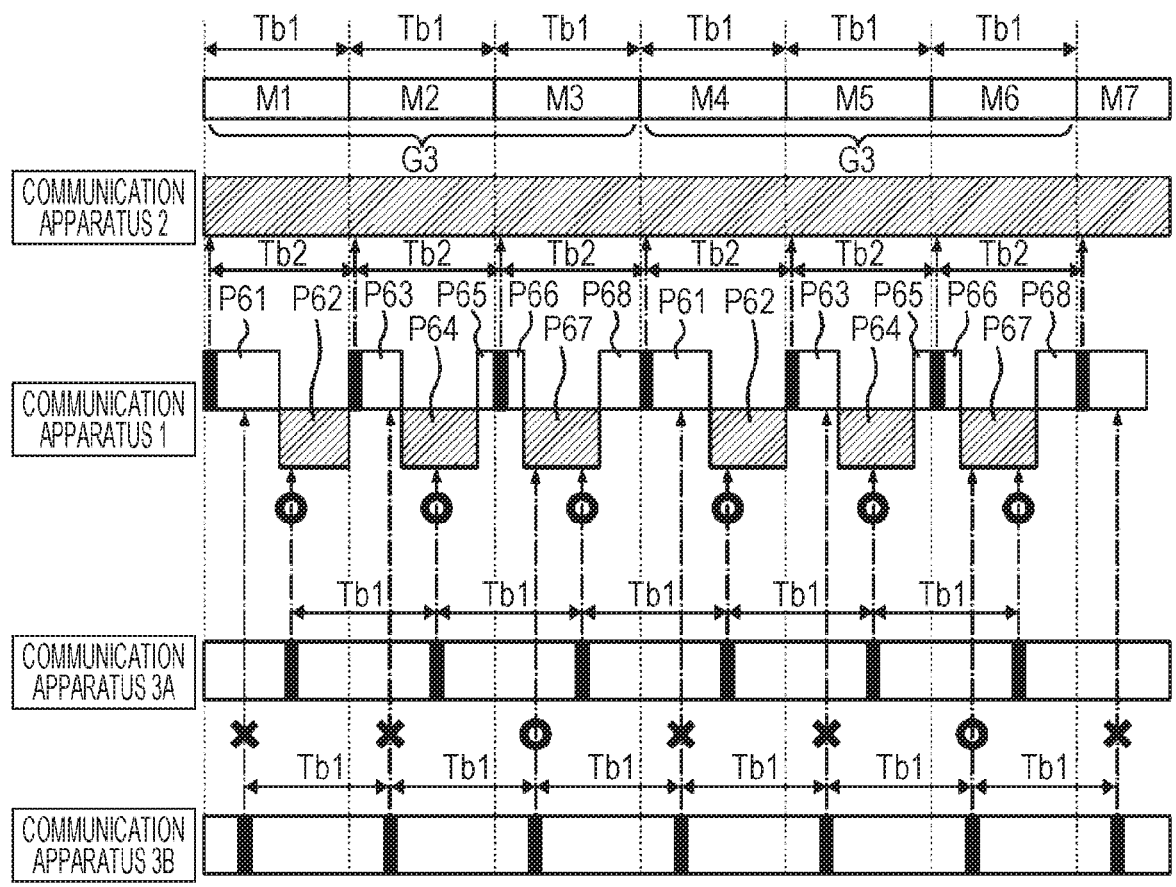
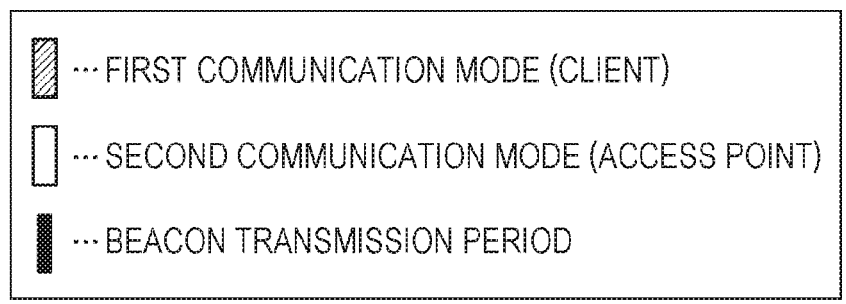

COMMUNICATION APPARATUS, COMMUNICATION METHOD, AND PROGRAM

CLAIM OF PRIORITY

This application is a Continuation of International Application No. PCT/JP2018/007319 filed on Feb. 27, 2018, which claims benefit of Japanese Patent Application No. 2017-046140 filed on Mar. 10, 2017. The entire contents of each application noted above are hereby incorporated by reference.

BACKGROUND

1. Field of the Disclosure

The present disclosure relates to a communication apparatus, a communication method, and a program that can switch between an operation as an access point and an operation as a client and, for example, relates to a communication apparatus for a wireless local area network (LAN).

2. Description of the Related Art

In general, in a system for a wireless LAN, communication using radio is performed between an apparatus (which may hereinafter be referred to as a "client") that operates as a client (which may also be called a station or a communication terminal), which is a terminal apparatus, and an apparatus that operates as an access point (which may also be called a repeater or a base station) that relays between the client and a network. The access point can communicate with a plurality of clients, each of which communicates with another client via the access point. Also, when the access point is connected through a cable network, each client can communication with appliances in the cable network via the access point. International Publication No. 2011/132761 discloses a communication terminal for a wireless LAN which can switch between a mode in which the communication terminal operates as an access point and a mode in which the communication terminal operates as a client.

A method in which each client searches for an access point includes an active scanning system and a passive scanning system. In the active scanning system, each client transmits a request signal (a probe request) to an access point, and the access point that has received the request signal transmits a response signal (a probe response) to the client. The client detects the access point, based on the response signal corresponding to the request signal. In the passive scanning system, on the other hand, an access point cyclically transmits a beacon signal, and based on the beacon signal, each client detects the access point. International Publication No. 2009/016800 discloses a wireless LAN terminal that is adapted to search for an access point by using the passive scanning system before searching for an access point by using the active scanning system. From the perspective of maintaining an appropriate communication state and quickly responding to changes in the communication environment, it is desirable that the detection of the access point in such a system be continued even after a client communicates and connects with one access point.

A function called a concurrent mode is known in which one communication apparatus switches between an operation of an access point and an operation of a client in a time division manner. FIG. 9 is a diagram illustrating an operation in a concurrent mode in related art. In an example illustrated in FIG. 9, a communication apparatus A operates in the concurrent mode. The communication apparatus A alternately repeats a period "AP" of an access point and a period "STA" of a client at generally the same time interval, and this interval of the repetition is denoted by "Tc". Communication apparatuses B and C are both access points and each repeatedly transmit a beacon signal at an interval Tb. In the operation in the concurrent mode, the communication apparatus A becomes able to transmit a beacon signal to another client in each period "AP" and becomes able to receive a beacon signal transmitted from another access point in each period "STA".

When the communication apparatus A is assumed to search for an access point in the periods "STA" of the client by using the passive scanning system client, a beacon signal of the access point needs to be transmitted in the periods "STA" of the client. However, for example, when the repetition interval Tc of the periods "STA" of the client and the transmission interval Tb of the beacon signal of the access point are equal to each other, there is a possibility that the transmission period of the beacon signal is constantly displaced from the periods "STA". In the example illustrated in FIG. 9, the beacon signal of the communication apparatus B is always transmitted in the periods "STA", whereas the beacon signal of the communication apparatus C is transmitted in the periods "AP". Accordingly, the communication apparatus A is not able to receive the beacon signal of the communication apparatus C as a client and thus cannot communication with the communication apparatus C.

The present disclosure has been made in view of such a situation and provides a communication apparatus, a communication method, and a program that iteratively switches between an operation as an access point and an operation as a client and that can make it difficult to bring about a state in which a beacon signal cyclically transmitted from another access point cannot be constantly received.

SUMMARY

A communication apparatus according to a first aspect of the present disclosure is a communication apparatus that is operable as a client or an access point. The communication apparatus includes: a communication processor that executes first communication processing in a first communication mode and executes second communication processing in a second communication mode, the first communication processing being processing in which the communication apparatus performs wireless communication with another access point as a client, the second communication processing being processing in which the communication apparatus performs wireless communication with another client as an access point; and a controller that controls a switching operation for switching between the first communication mode and the second communication mode. The communication processor becomes able to receive a first beacon signal transmitted from the other access point in the first communication mode, and becomes able to transmit a second beacon signal for the other client to detect the communication apparatus as an access point in the second communication mode.

The controller switches between the first communication mode and the second communication mode in a time division manner in each predetermined-length time segment that is cyclically repeated, changes a period in the first communication mode in one of the time segments as the time segment advances, and controls the switching operation so that a length of the time segment becomes equal to a transmission interval of the first beacon signal, a transmission interval of the second beacon signal becomes N times (N indicates a natural number) of the length of the time segment, and at least a part of a period in the second communication mode and at least a part of a period in the first communication mode in one of the time segments are interchanged in the two contiguous time segments.

According to this configuration, in each predetermined-length time segment, the first communication mode and the second communication mode are switched therebetween. Also, a period in the first communication mode in one of the time segments changes as the time segment advances. Thus, since the period in the first communication mode in one of the time segments changes as the time segment advances, it is easier for the period in the first communication mode and the transmission period of the beacon signal cyclically transmitted from another access point to overlap each other, thus making it easier for the beacon signal to be received in the first communication processing.

Also, according to this configuration, it is easier to perform transmission of the first beacon signal and transmission of the second beacon signal in conjunction with each other, facilitating an operation that cooperates with the other access point.

Also, according to this configuration, at least a part of the period in the second communication mode in the two contiguous time segments and at least a part of the period in the first communication mode in the other of the two contiguous time segments are interchanged. The interchange of the periods makes it easier for the period in the first communication mode and the transmission period of the first beacon signal to overlap each other and makes it easier for the first beacon signal to be received in the first communication processing. Also, since the interchange of the periods occurs in the two contiguous time segments, the time for the first beacon signal to be received in the first communication processing decreases.

A second aspect of the present disclosure relates to a communication method for a communication apparatus that is operable as a client or an access point. The communication method includes: a first communication processing process in which, in a first communication mode, the communication apparatus performs wireless communication with another access point as a client; a second communication processing process in which, in a second communication mode, the communication apparatus performs wireless communication with another client as an access point; and a communication mode switching process in which a switching operation is controlled for switching between the first communication mode and the second communication mode. A first beacon signal transmitted from the other access point becomes receivable in the first communication processing process in the first communication mode, and a second beacon signal for the other client to detect the communication apparatus as an access point becomes transmittable in the second communication processing process in the second communication mode. In the communication mode switching process, in each predetermined-length time segment that is cyclically repeated, the first communication mode and the second communication mode are switched therebetween in a time division manner, a period in the first communication mode in one of the time segments is changed as the time segment advances, and the switching operation is controlled so that a length of the time segment becomes equal to a transmission interval of the first beacon signal, a transmission interval of the second beacon signal becomes N times (N indicates a natural number) of the length of the time segment, and at least a part of a period in the second communication mode and at least a part of a period in the first communication mode in one of the time segments are interchanged in the two contiguous time segments.

A third aspect of the present disclosure relates to a program for causing a computer in the communication apparatus to execute the communication method according to the second aspect of the present disclosure.

According to the present disclosure, an operation as an access point and an operation as a client are iteratively switched therebetween, and it is possible to make it difficult to bring about a state in which a beacon signal cyclically transmitted from another access point cannot be constantly received.

BRIEF DESCRIPTION OF THE DRAWINGS

FIG. 4 is a diagram illustrating a first modification of the operation in the concurrent mode in the communication apparatus according to the embodiment of the present disclosure;

FIG. 5 is a diagram illustrating a second modification of the operation in the concurrent mode in the communication apparatus according to the embodiment of the present disclosure;

FIG. 6 is a diagram illustrating a third modification of the operation in the concurrent mode in the communication apparatus according to the embodiment of the present disclosure;

FIG. 7 is a diagram illustrating a fourth modification of the operation in the concurrent mode in the communication apparatus according to the embodiment of the present disclosure;

FIG. 8 is a diagram illustrating a fifth modification of the operation in the concurrent mode in the communication apparatus according to the embodiment of the present disclosure.

DESCRIPTION OF THE EXEMPLARY EMBODIMENTS

Figure 1:
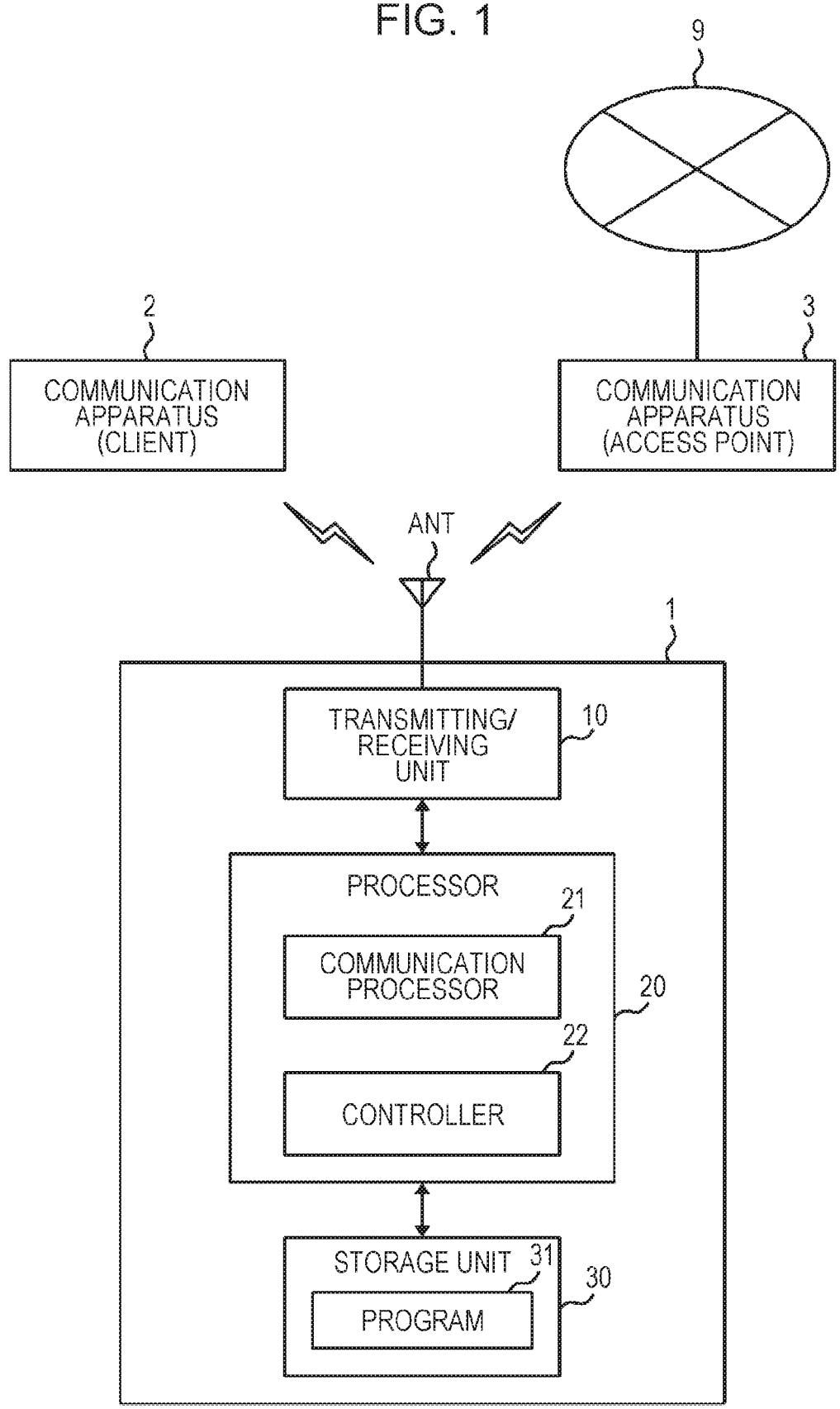
FIG. 1 is a diagram illustrating one example of the configuration of a communication apparatus according to an embodiment of the present disclosure.

A communication apparatus according to an embodiment of the present disclosure will be described below with reference to the accompanying drawings. FIG. 1 is a diagram illustrating one example of the configuration of a communication apparatus according to the present embodiment. A communication apparatus 1 illustrated in FIG. 1 is a communication apparatus for a wireless LAN and performs communication that complies with, for example, standards in the Institute of Electrical and Electronics Engineers (IEEE) 802.11.

In the present embodiment, the communication apparatus 1 can switch between an operation as a client, which is a terminal apparatus, and an operation as an access point that relays between a client and a network. A communication mode in which the communication apparatus performs wireless communication with another access point as a client (this communication mode may also be referred to as a "station mode" or a "terminal mode") is referred to as a "first communication mode". Also, a communication mode in which the communication apparatus performs wireless communication with another client as an access point (this communication mode may also be referred to as an "access point mode" or a "base station mode") may be referred to as a "second communication mode".

The communication apparatus 1 has the function of the concurrent mode in which the first communication mode and the second communication mode are switched therebetween in a time division manner. In FIG. 1, a communication apparatus 3 is an access point for a wireless LAN and performs wireless communication with the communication apparatus 1 that is in the first communication mode. The communication apparatus 3 is connected to a network 9 (a LAN, the Internet, and so on) and relays a communication between appliances in the network 9 and the communication apparatus 1. Also, in FIG. 1, a communication apparatus 2 is a client in the wireless LAN and performs wireless communication with the communication apparatus 1 that is in the second communication mode.

For example, as illustrated in FIG. 1, the communication apparatus 1 has a transmitting/receiving unit 10, a processor 20, and a storage unit 30.

The transmitting/receiving unit 10 transmits and receives radio signals in the wireless LAN. The transmitting/receiving unit 10 performs signal processing, such as modulation, frequency conversion, and electric power amplification, on transmission data input from the processor 20 to generate RF signals and transmits the RF signals as a radio wave in a predetermined band via an antenna ANT. Also, the transmitting/receiving unit 10 performs signal processing, such as amplification, frequency conversion, and demodulation, on RF signals over a radio wave in the predetermined band, the RF signals being received via the antenna ANT, to generate reception data and outputs the reception data to the processor 20.

The processor 20 is a device that controls overall operation of the communication apparatus 1 and includes, for example, a computer (such as microprocessor) that executes instructions based on a program 31 stored in the storage unit 30. The processor 20 may execute all processing by using the computer or may execute at least part of the processing by using a dedicated logic circuit. Also, the processor 20 may be constituted by a single integrated circuit (IC) or may be constituted by a plurality of ICs. At least part of the transmitting/receiving unit 10 and at least part of the processor 20 may be configured on a common IC.

The processor 20 has a communication processor 21 and a controller 22, which are blocks for performing processing regarding communication in the wireless LAN.

In the first communication mode, the communication processor 21 executes first communication processing in which the communication apparatus performs wireless communication with another access point as a client, and in the second communication mode, the communication processor 21 executes second communication processing in which the communication apparatus performs wireless communication with another client as an access point.

In the first communication mode in which the communication apparatus operates as a client, the communication processor 21 receives a beacon signal (hereinafter referred to as a "first beacon signal") cyclically transmitted from another access point (the communication apparatus 3) and detects the other access point based on the received first beacon signal. That is, the communication processor 21 detects an access point by using the passive scanning system. The transmission interval at which the first beacon signal is transmitted from the other access point (the communication apparatus 3) is "Tb1".

Also, in the second communication mode in which the communication apparatus operates as an access point, the communication processor 21 cyclically transmits a beacon signal (hereinafter referred to as a "second beacon signal") for the other client (the communication apparatus 2) to detect the communication apparatus as an access point. The transmission interval at which the communication apparatus 1 transmits the second beacon signal in the second communication mode is "Tb2".

The controller 22 controls a switching operation for switching between the first communication mode and the second communication mode in the concurrent mode. Specifically, in each predetermined-length time segment that is cyclically repeated, the controller 22 switches between the first communication mode and the second communication mode. Also, the controller 22 changes a period in the first communication mode in one time segment, as the time segment advances. In the present embodiment, a description will be given assuming that the repetition interval of the time segment, that is, the length of the time segment, is equal to "Tb1", which is the transmission interval of the first beacon signal.

The controller 22 controls the switching operation for switching between the first communication mode and the second communication mode so as to have a transmission period of the second beacon signal in the second communication mode for each "Tb2". That is, the controller 22 controls the switching operation for switching between the first communication mode and the second communication mode so that, for each "Tb2", the communication mode becomes the second communication mode before the transmission time of the second beacon signal, and the communication mode switches to the first communication mode after ending of the transmission of the second beacon signal. This makes it possible to transmit the second beacon signal at the transmission interval "Tb2".

The storage unit 30 stores the program 31 executed by the computer in the processor 20, constant data used in processing in the processor 20, variable data temporarily held during the process of processing, and so on. The storage unit 30 has a configuration including arbitrary storage devices, such as a read-only memory (ROM), a random-access memory (RAM), and a flash memory. The program 31 may be pre-stored in the ROM in the storage unit 30 or the like, may be a program downloaded from a device (such as a main controller), not illustrated, and written to the storage unit 30, or a program read from a non-transitory tangible medium (such as a digital versatile disc (DVD) or a Universal Serial Bus (USB) memory) by a device, not illustrated, and written to the storage unit 30.

Figure 2:
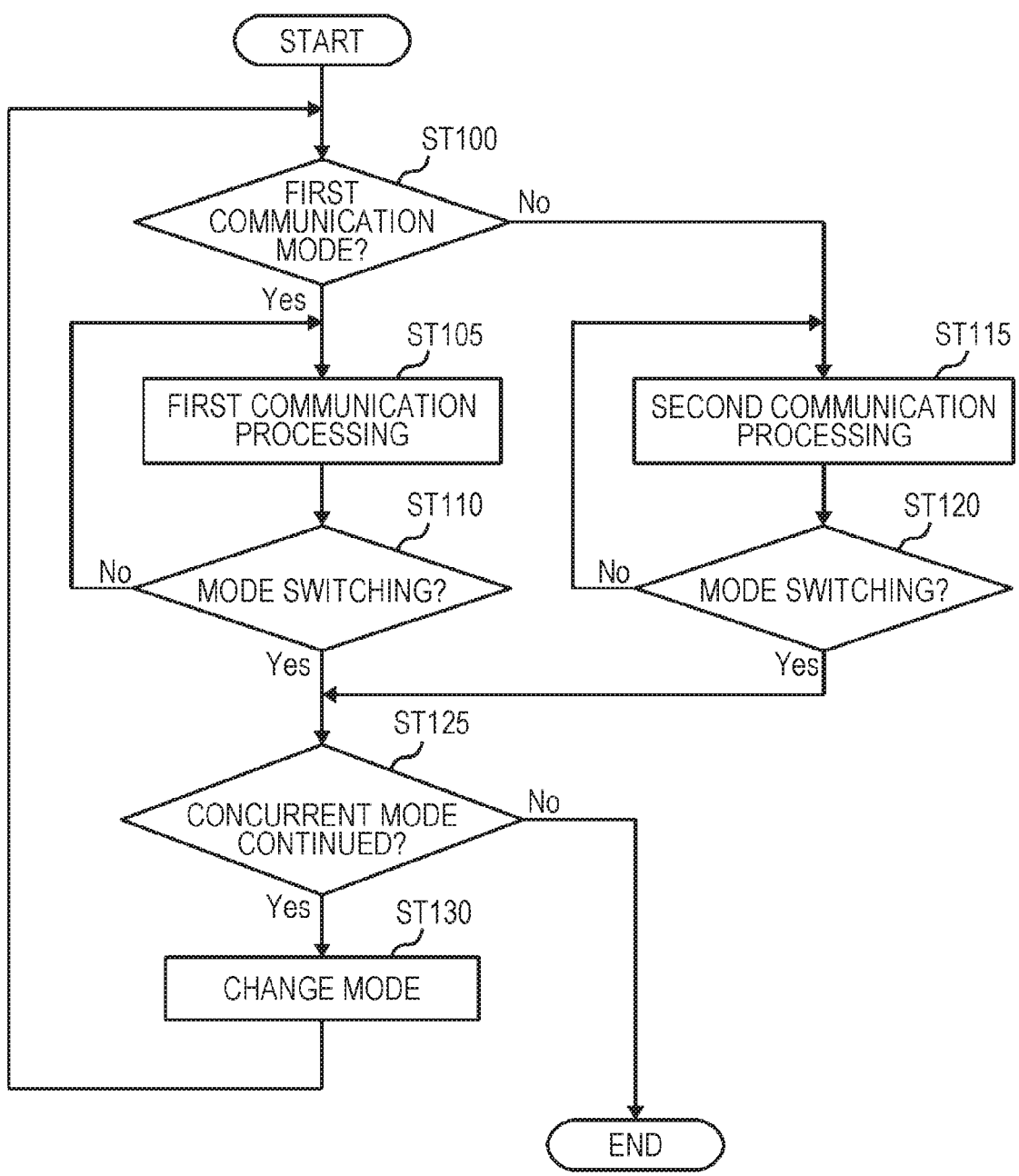
FIG. 2 is a flowchart for describing the operation in a concurrent mode in the communication apparatus according to the embodiment of the present disclosure.

Now, a description will be given of an operation in the concurrent mode in the communication apparatus 1 having the above-described configuration. FIG. 2 is a flowchart for describing an operation in the concurrent mode in the communication apparatus 1 according to the present embodiment.

The communication processor 21 determines which of the first communication mode and the second communication mode the current communication mode is (ST100). When the current communication mode is the first communication mode, the communication processor 21 executes the first communication processing in which the communication apparatus 1 performs wireless communication as a client (ST105). When the current communication mode is the second communication mode, the communication processor 21 executes the second communication processing in which the communication apparatus 1 performs wireless communication as an access point (ST115).

When the communication processor 21 is executing the first communication processing in the first communication mode (ST105), the controller 22 monitors the timing of switching to the second communication mode (ST110). When the timing of switching to the second communication mode is reached, and the concurrent mode is continuing (ST125), the controller 22 changes the communication mode to the second communication mode (ST130).

Also, when the communication processor 21 is executing the second communication processing in the second communication mode (ST115), the controller 22 monitors the timing of switching to the first communication mode (ST120). When the timing of switching to the first communication mode is reached, and the concurrent mode is continuing (ST125), the controller 22 changes the communication mode to the first communication mode (ST130). When the controller 22 changes the communication mode (ST130), the communication processor 21 returns to step ST100 and repeats the above-described processing.

Figure 3:
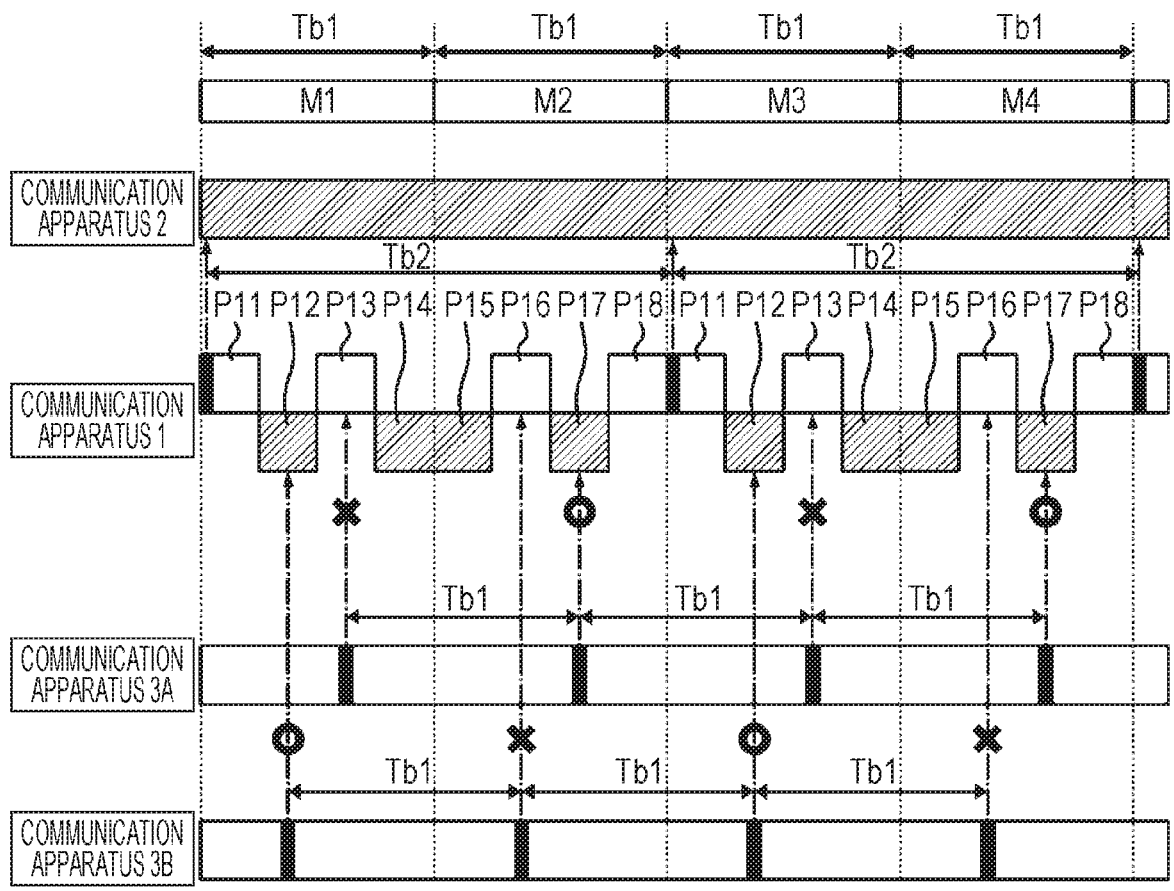
FIG. 3 is a diagram illustrating one example of the operation in the concurrent mode in the communication apparatus according to the embodiment of the present disclosure.
Figure 9:
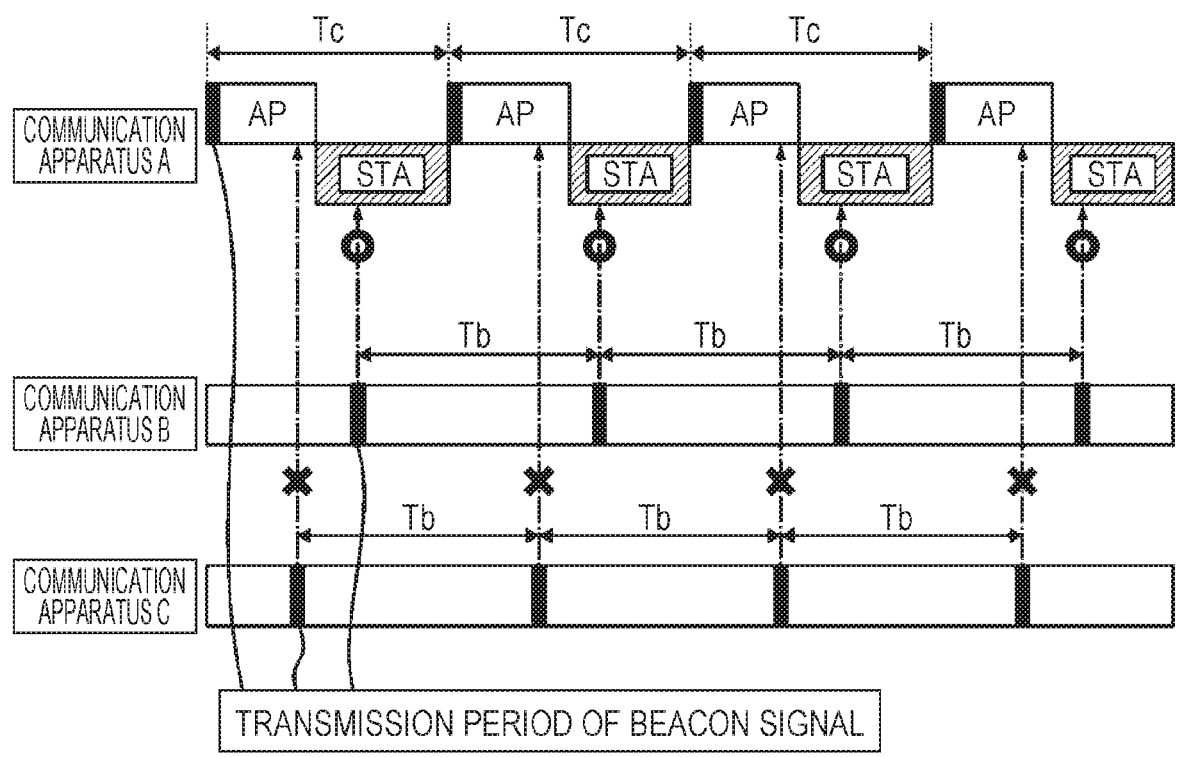
FIG. 9 is a diagram illustrating an operation in related art.

FIG. 3 is a diagram illustrating one example of the operation in the concurrent mode according to the present embodiment. Symbols "M1" to "M4" in FIG. 3 denote time segments that are references for communication-mode switching performed by the controller 22. In the description below, one arbitrary time segment may be denoted by "M". The length of the time segments M is equal to the transmission interval "Tb1" at which the first beacon signal is transmitted from the access point (the communication apparatus 3).

In the example illustrated in FIG. 3, two communication apparatuses 3A and 3B exist as access points that can communicate with the communication apparatus 1. The communication apparatuses 3A and 3B each transmit the first beacon signal at the transmission interval "Tb1", and the transmission timings are offset from each other. In the following description, the communication apparatuses 3A and 3B may be referred to as a "communication apparatus 3" without distinguishing therebetween.

In the present embodiment, the controller 22 may interchange all the periods in the first communication mode and all the periods in the second communication mode in two contiguous time segments M. For example, in FIG. 3, in a time segment M1, four periods P11 to P14 exist in the order of "P11", "P12", "P13", and "P14", and in a time segment M2, which follows the time segment M1, four periods P15 to P18 exist in the order of "P15", "P16", "P17", and "P18". The periods P11 to P14 in the time segment M1 and the periods P15 to P18 in the time segment M2 have one-to-one correspondence relationships. That is, the periods P11 and P15, the periods P12 and P16, the periods P13 and P17, and the periods P14 and P18 have correspondence relationships, respectively. The pairs of periods having the correspondence relationship have ranges that match each other in the time segments and have communication modes that differ from each other. That is, in the periods P12 and P14 in the time segment M1, the communication mode becomes the first communication mode, and in the periods P16 and P18 in the time segment M2 that have the correspondence relationship therewith, the communication mode becomes the second communication mode. Also, in the periods P11 and P13 in the time segment M1, the communication mode becomes the second communication mode, and in the periods P15 and P17 in the time segment M2, which have the correspondence relationship therewith, the communication mode becomes the first communication mode.

In a time segment M3, which follows the time segment M2, four periods P11 to P14, which are similar to those in the time segment M1, exist. In a time segment M4, which follows the time segment M3, four periods P15 to P18, which are similar to those in the time segment M3, exist. Subsequently, similarly, a time segment M in which four periods P11 to P14 exist and a time segment M in which four periods P15 to P18 exist are alternately repeated.

Accordingly, in two contiguous time segments, the pairs of periods having the correspondence relationship have ranges that match each other in the time segments and have communication modes that differ from each other. That is, all of the periods in the first communication mode and all of the periods in the second communication mode are interchanged in two contiguous time segments M.

In the example in FIG. 3, the communication apparatus 3A transmits the first beacon signal in the period P13 in the time segment M1. Since the communication apparatus 1 is in the second communication mode in the period P13, the communication apparatus 1 does not receive the first beacon signal from the communication apparatus 3A. However, the transmission interval "Tb1" of the first beacon signal of the communication apparatus 3A and the repetition interval of the time segment M are equal to each other, and thus, in the time segment M2, which follows the time segment M1, the first beacon signal of the communication apparatus 3A is transmitted in the period P17, which has the correspondence relationship with the period P13. Since the communication apparatus 1 is in the first communication mode in the period P17, the communication apparatus 1 receives the first beacon signal of the communication apparatus 3A. Similarly, the first beacon signal of the communication apparatus 3B is transmitted in each of two periods P12 and P16, which have the correspondence relationship, in two contiguous time segments M. Thus, the communication apparatus 1 receives the first beacon signal of the communication apparatus 3B in the period P12 in which the communication apparatus 1 enters the first communication mode. Accordingly, the communication apparatus 1 in the first communication mode receives the first beacon signal, transmitted from an access point at the transmission interval "Tb1", at twice the interval of the transmission interval "Tb1".

As illustrated in FIG. 3, in two time segments M that sandwich one time segment M, the ranges of the periods in the second communication mode in the time segments match each other. Thus, the communication apparatus 1 can ensure the transmission periods of the second beacon signal at twice the interval of the transmission interval "Tb1". In the example illustrated in FIG. 3, the transmission interval "Tb2" of the second beacon signal is twice the transmission interval "Tb1" of the first beacon signal.

As described above, according to the present embodiment, in each cyclical time segment M in which the transmission interval "Tb1" of the first beacon signal of the other access point (the communication apparatus 3) is one interval, the first communication mode and the second communication mode are switched therebetween. Also, the period in the first communication mode in one time segment M changes, as the time segment M advances. Thus, since the period in the first communication mode in one time segment M changes as the time segment M advances, it is easier for the period in the first communication mode and the transmission period of the first beacon signal to overlap each other. Since it is easier for the period in the first communication mode and the transmission period of the first beacon signal to overlap each other, it is easier for the first beacon signal to be received in the first communication processing, and it is thus possible to make it difficult to bring about a state in which the first beacon signal cannot be constantly received. Accordingly, the access point (the communication apparatus 3) can be stably detected by the passive scanning system.

Also, according to the present embodiment, the switching operation for switching between the communication modes is controlled so as to have a beacon transmission period in the second communication mode for each interval "Tb2", thereby transmitting the second beacon signal to the other client (the communication apparatus 2) at the interval "Tb2". Accordingly, the other client (the communication apparatus 2) can stably detect the communication apparatus by using the passive scanning system.

The use of the passive scanning system makes it possible to omit transmission of a request signal (Probe Request) from a client to an access point, thus making it possible to enhance throughput in communication, compared with a case in which the active scanning system is used.

Also, according to the present embodiment, all the periods in the second communication mode in one of two contiguous time segments M and all the periods in the first communication mode in the other of the two contiguous time segments M are interchanged. Thus, in one of two contiguous time segments M, a period in the first communication mode and the transmission period of the first beacon signal overlap each other, thus making it possible to reliably receive the first beacon signal in the first communication processing. Accordingly, it is possible to more stably detect the other access point (the communication apparatus 3) by using the passive scanning system.

In addition, since the interchange of the periods in the first communication mode and the periods in the second communication mode in two contiguous time segments M occurs, it is possible to reduce the time taken to receive the first beacon signal in the first communication processing.

Furthermore, since the period in the second communication mode is iterated at twice the interval of the transmission interval "Tb1", the transmission interval "Tb2" of the second beacon signal in the second communication mode can be set to twice the transmission interval "Tb1" of the first beacon signal. Setting the transmission interval "Tb2" of the second beacon signal to N times (N indicates a natural number) of the transmission interval "Tb1" of the first beacon signal, as described above, makes it easier to perform the transmission of the first beacon signal and the transmission of the second beacon signal in conjunction with each other, facilitating an operation that cooperates with another access point.

Next, a modification of the operation in the concurrent mode in the communication apparatus 1 according to the present embodiment will be described with reference to FIGS. 4 to 8.

FIG. 4 is a diagram illustrating a first modification of the operation in the concurrent mode in the communication apparatus 1 according to the present embodiment. In the first modification in FIG. 4, the controller 22 interchanges all periods in the first communication mode and all periods in the second communication mode are interchanged in two contiguous time segments M. In the example illustrated in FIG. 3, four periods have a one-to-one correspondence relationship in two contiguous time segments M, whereas, in the first modification in FIG. 4, two periods have a one-to-one correspondence relationship in two contiguous time segments M. That is, in one of two contiguous time segments M, two periods P21 and P22 exist in the order of the periods P21 and P22, and in the other of the two contiguous time segments M, two periods P23 and P24 exist in the order of the periods P23 and P24. The periods P21 and P23 have a correspondence relationship with each other, and the periods P22 and P24 have a correspondence relationship with each other. The pairs of periods having the correspondence relationship have ranges that match each other in the time segments and have different communication modes. That is, in the period P21, the communication mode becomes the second communication mode, and in the period P23 having the correspondence relationship therewith, the communication mode becomes the first communication mode. Also, in the period P22, the communication mode becomes the first communication mode, and in the period P24 having the correspondence relationship therewith, the communication becomes the second communication mode.

In the example in FIG. 4, as in the example in FIG. 3, the first beacon signal of the other access point (the communication apparatus 3) is transmitted in two periods (the periods P21 and P23, or the periods P22 and P24) having the correspondence relationship in two contiguous time segments M. Since the communication mode in one of two periods having the correspondence relationship is the first communication mode, the communication apparatus 1 in the first communication mode receives the first beacon signal, transmitted from the access point at the interval "Tb1", at twice the interval of the interval "Tb1". Accordingly, in the first modification, advantages that are similar to those in the example in FIG. 3 are also obtained.

FIG. 5 is a diagram illustrating a second modification of the operation in the concurrent mode in the communication apparatus 1 according to the present embodiment. In the second modification, the controller 22 may alternately repeat time segments (M2, M4, . . . ) in which a period in the first communication mode is longer than a period in the second communication mode and time segments (M1, M3, . . . ) in which a period in the first communication mode is shorter than a period in the second communication mode. Each of the time segments M1, M3, . . . includes a period P31 in the second communication mode and a period P32 in the first communication mode which is shorter than the period P31. Each of the time segments M2, M4, . . . includes a period P33 in the second communication mode and a period P34 in the first communication mode which is longer than the period P33.

Also, in the second modification illustrated in FIG. 5, the transmission interval "Tb2" of the second communication mode in the second beacon signal in the communication apparatus 1 is equal to the transmission interval "Tb1" of the first beacon signal of the other access point (the communication apparatus 3). That is, in each time segment M, the communication processor 21 transmits the second beacon signal.

In the second modification, a part of the period in the second communication mode in one of two contiguous time segments M and a part of the period in the first communication mode in the other of the two contiguous time segments M are interchanged. Since the periods are interchanged, it is easier for the period in the first communication mode and the transmission period of the first beacon signal to overlap each other, thus making it easier for the first beacon signal to be received in the first communication processing. In the example illustrated in FIG. 5, in the time segment M1, M3, . . . in which the period P32 in the first communication mode is short, the communication apparatus 1 receives neither of the first beacon signals of the communication apparatus 3A and 3B, but the communication apparatus 1 receives both these first beacon signals in the time segment M2, M4, . . . in which the period P32 in the first communication mode is long. Accordingly, in the second modification, it is also possible to make it difficult to bring about a state in which the first beacon signal cannot be constantly received.

Also, since the period in the first communication mode and the period in the second communication mode are interchanged in two contiguous time segments M, it is possible to reduce the time taken for the first beacon signal to be received in the first communication processing. When a plurality of access points are arranged in the same area and are operated in cooperation with each other, there are cases in which setting is performed so that the transmission intervals of the beacon signals transmitted from all the access points are equal to each other and only the transmission timings of the beacon signals differ, and the operation according to the second modification is particularly preferable in such cases.

FIG. 6 is a diagram illustrating a third modification of the operation in the concurrent mode in the communication apparatus 1 according to the present embodiment. In the third modification, the controller 22 may iterate a group of time segments G1 in which the length of the period in the first communication mode increases from a predetermined initial value in a stepwise manner. In the third modification in FIG. 6, one group of time segments G1 includes three time segments M. Each of the three time segments M includes a period P41 in the second communication mode and a period P42 in the first communication mode.

In the first time segment M in the group of time segments G1, the period P42 in the first communication mode is the shortest, and the later the time segment M is in the order, the longer the period P42 in the first communication mode is. The transmission interval "Tb2" of the second beacon signal of the communication apparatus 1 is equal to the transmission interval "Tb1" of the first beacon signal.

In the third modification, a part of the period in the second communication mode in one of two contiguous time segments M and a part of the period in the first communication mode in the other of the two contiguous time segments M are also interchanged as in the second modification, thus making it easier for the first beacon signal to be received in the first communication processing. In the example illustrated in FIG. 6, the communication apparatus 1 receives the first beacon signal of the communication apparatus 3A in the second and third time segments M in the group of time segments G1, and the communication apparatus 1 receives the first beacon signal of the communication apparatus 3B in the third time segment M in the group of time segments G1.

Accordingly, in the third modification, it is also possible to make it difficult to bring about a state in which the first beacon signal cannot be constantly received. Also, since the interchange of a period in the first communication mode and a period in the second communication mode occurs in two contiguous time segments M, it is possible to reduce the time taken for the first beacon signal to be received in the first communication processing. There are cases in which it is desirable that the communication environment do not change sharply for a certain period of time, depending on the type of data transmitted/received between an access point and a client. The operation according to the third modification is particularly preferable in such cases.

FIG. 7 is a diagram illustrating a fourth modification of the operation in the concurrent mode in the communication apparatus 1 according to the present embodiment. In the fourth modification, the controller 22 may iterate a group of time segments G2 in which the length of the period in the first communication mode decreases from a predetermined initial value in a stepwise manner. In the fourth modification in FIG. 7, the group of time segments G2 includes three time segments M. Each of the three time segments M includes a period P51 in the second communication mode and a period P52 in the first communication mode.

In the first time segment M in the group of time segments G2, the period P52 in the first communication mode is the longest, and the later the time segment M is in the order, the shorter the period P52 in the first communication mode is. The transmission interval "Tb2" of the second beacon signal of the communication apparatus 1 is equal to the transmission interval "Tb1" of the first beacon signal. In the fourth modification, advantages that are similar to those in the third modification are also obtained.

FIG. 8 is a diagram illustrating a fifth modification of the operation in the concurrent mode in the communication apparatus 1 according to the present embodiment. In the fifth modification, the controller 22 may iterate a group of time segments G3 in which the lengths of periods in the first communication mode are equal to each other and distributions of the periods differ from each other. In the fifth modification in FIG. 8, the group of time segments G3 includes three time segments M. In the three time segments M, the first time segment M includes a period P61 in the second communication mode and a period P62 in the first communication mode, the second time segment M includes a period P63 in the second communication mode, a period P64 in the first communication mode, and a period P65 in the second communication mode, and the third time segment M includes a period P66 in the second communication mode, a period P67 in the first communication mode, and a period P68 in the second communication mode. The lengths of the periods P62, P64, and P67 in the first communication mode are equal to each other. The period P62 is the closest to the last point in time in the time segment M, and the period P67 is the closest to the first point in time in the time segment M. The transmission interval "Tb2" of the second beacon signal of the communication apparatus 1 is equal to the transmission interval "Tb1" of the first beacon signal.

In the fifth modification, a part of the period in the second communication mode in one of two contiguous time segments M and a part of the period in the first communication mode in the other of the two contiguous time segments M are interchanged, as in the second to fourth modifications, thus making it easier for the first beacon signal to be received in the first communication processing. In the example illustrated in FIG. 8, the communication apparatus 1 receives the first beacon signal of the communication apparatus 3A in all the time segments M in the group of time segments G3, and the communication apparatus 1 receives the first beacon signal of the communication apparatus 3B in the third time segment M in the group of time segments G3. Accordingly, in the fifth modification, it is also possible to make it difficult to bring about a state in which the first beacon signal cannot be constantly received. Also, since a period in the first communication mode and a period in the second communication mode are interchanged in two contiguous time segments M, it is possible to reduce the time taken for the first beacon signal to be received in the first communication processing.

In addition, in the fifth modification, since the lengths of the periods in the first communication mode in the group of time segments G3 that is iterated are equal to each other, it is easier to stably ensure throughput in communication in the first communication mode.

The present disclosure is not limited to the above-described embodiment and also encompasses various variations.

In the above-described examples of the operation in the concurrent mode illustrated in FIGS. 3 and 4, the interval "Tb2" of the second beacon signal that the communication apparatus 1 transmits as an access point is set to twice the transmission interval "Tb1" of the first beacon signal that the communication apparatus 1 receives as a client, and in the examples of the operation in the concurrent mode illustrated in FIGS. 5 to 8, the transmission interval "Tb2" of the second beacon signal is set equal to the transmission interval "Tb1" of the first beacon signal; however, the present disclosure is not limited to the examples. That is, the transmission interval "Tb2" of the second beacon signal can also be set to N times (N indicates a natural number) of the transmission interval "Tb1" of the first beacon signal.

Although examples in which the present disclosure is applied to a system for a wireless LAN have been described in the above-described embodiment, the present disclosure is applicable to various wireless communication systems in which an access point and a client communicate with each other.

What is claimed is:

1. A communication apparatus that is operable as a client or an access point, the communication apparatus comprising:
    a communication processor that executes first communication processing in a first communication mode and executes second communication processing in a second communication mode, the first communication processing being processing in which the communication apparatus performs wireless communication with another access point as a client, the second communication processing being processing in which the communication apparatus performs wireless communication with another client as an access point; and
    a controller that controls a switching operation for switching between the first communication mode and the second communication mode,
    wherein the communication processor becomes able to receive a first beacon signal transmitted from the other access point in the first communication mode, and becomes able to transmit a second beacon signal for the other client to detect the communication apparatus as an access point in the second communication mode; and
    wherein the controller switches between the first communication mode and the second communication mode in a time division manner in each predetermined-length time segment that is cyclically repeated, changes a period in the first communication mode in one of the time segments as the time segment advances, and controls the switching operation so that a length of the time segment becomes equal to a transmission interval of the first beacon signal, a transmission interval of the second beacon signal becomes N times (N indicates a natural number) of the length of the time segment, and at least a part of a period in the second communication mode and at least a part of a period in the first communication mode in one of the time segments are interchanged in the two contiguous time segments.

2. The communication apparatus according to claim 1, wherein the controller controls the switching operation to interchange all periods in the first communication mode and all periods in the second communication mode in the two contiguous time segments.

3. The communication apparatus according to claim 1, wherein the controller controls the switching operation to alternately repeat the time segment in which a period in the first communication mode is longer than a period in the second communication mode and the time segment in which a period in the first communication mode is shorter than a period in the second communication mode.

4. The communication apparatus according to claim 1, wherein the controller controls the switching operation to iterate a group of time segments in which a length of the period in the first communication mode decreases or increases from a predetermined initial value in a stepwise manner.

5. The communication apparatus according to claim 1, wherein the controller controls the switching operation to iterate a group of time segments in which lengths of periods in the first communication mode are equal to each other and distributions of the periods differ from each other.

6. A communication method for a communication apparatus that is operable as a client or an access point, the communication method comprising:
    a first communication processing process in which, in a first communication mode, the communication apparatus performs wireless communication with another access point as a client;
    a second communication processing process in which, in a second communication mode, the communication apparatus performs wireless communication with another client as an access point; and
    a communication mode switching process in which a switching operation is controlled for switching between the first communication mode and the second communication mode,
    wherein a first beacon signal transmitted from the other access point becomes receivable in the first communication processing process in the first communication mode, and a second beacon signal for the other client to detect the communication apparatus as an access point becomes transmittable in the second communication processing process in the second communication mode; and
    wherein, in the communication mode switching process, in each predetermined-length time segment that is cyclically repeated, the first communication mode and the second communication mode are switched therebetween in a time division manner, a period in the first communication mode in one of the time segments is changed as the time segment advances, and the switching operation is controlled so that a length of the time segment becomes equal to a transmission interval of the first beacon signal, a transmission interval of the second beacon signal becomes N times (N indicates a natural number) of the length of the time segment, and at least a part of a period in the second communication mode and at least a part of a period in the first communication mode in one of the time segments are interchanged in the two contiguous time segments.

7. A nonvolatile memory having processor instructions stored therein, wherein when the processor instructions are executed on a processor, the processor implements a communication method comprising:

- a first communication processing process in which, in a first communication mode, the communication apparatus performs wireless communication with another access point as a client;
- a second communication processing process in which, in a second communication mode, the communication apparatus performs wireless communication with another client as an access point; and
- a communication mode switching process in which a switching operation is controlled for switching between the first communication mode and the second communication mode,
- wherein a first beacon signal transmitted from the other access point becomes receivable in the first communication processing process in the first communication mode, and a second beacon signal for the other client to detect the communication apparatus as an access point becomes transmittable in the second communication processing process in the second communication mode; and
- wherein, in the communication mode switching process, in each predetermined-length time segment that is cyclically repeated, the first communication mode and the second communication mode are switched therebetween in a time division manner, a period in the first communication mode in one of the time segments is changed as the time segment advances, and the switching operation is controlled so that a length of the time segment becomes equal to a transmission interval of the first beacon signal, a transmission interval of the second beacon signal becomes N times (N indicates a natural number) of the length of the time segment, and at least a part of a period in the second communication mode and at least a part of a period in the first communication mode in one of the time segments are interchanged in the two contiguous time segments.

* * * * *